Patented Oct. 24, 1933

1,931,485

UNITED STATES PATENT OFFICE 1,931,485

PRINTING COMPOSITION

Amerigo F. Caprio and William Bowker, Newark, N. J., assignors to Celluloid Corporation, a corporation of New Jersey No Drawing. Application September 24, 1930
Serial No. 484,232

9 Claims. (Cl. 106—40)

This invention relates to the making of satisfactory inks for printing on or decorating cellulose acetate plastic materials, particularly such as have a cellulose acetate base.

The printing of plastics made of or containing cellulose derivatives has presented considerable difficulties, particularly in the polishing operation which usually follows the printing step. While inks for this purpose have heretofore been produced, these inks could not be satisfactorily employed on all cellulose derivative plastics. Thus, for example, printing inks containing linseed oil can be used on nitrocellulose celluloid but are not at all suitable for use on plastics made of or containing organic derivatives of cellulose such as cellulose acetate, cellulose butyrate, ethyl cellulose and the like since the ink had a tendency to transfer onto the polishing plates. Attempts to overcome this ink transfer phenomenon by spraying the ink with a thin celluloid lacquer proved ineffective.

Another objectionable feature with inks heretofore employed is the length of time necessary for the same to set so as to be in condition for polishing, due to the presence of the linseed oil or other oxidizable oil.

An object of this invention is to provide a printing ink suitable for use on all cellulose derivative plastics, particularly cellulose acetate.

Another object of this invention is to provide an ink which will become an integral part of the cellulose derivative plastic printed.

A further object of our invention is to provide a printing ink which will set very rapidly.

Still another object of this invention is to provide a printing ink which will not be liable to ink transference when printed on cellulose derivative plastics. Other objects and advantages will appear from the following detailed description.

In accordance with our invention we have discovered a printing ink which can be suitably used on plastics made with any cellulose derivative with no smearing of the ink or transference thereof to the polishing plates. The ink made in accordance with our invention contains cellulose derivatives of low viscosity. Examples of such cellulose derivatives are cellulose nitrate, cellulose acetate, cellulose butyrate, methyl cellulose and the like. In addition to the cellulose derivatives the ink contains a suitable pigment, a solvent plastifier or mixtures of plastifiers. Where desired, a volatile solvent may be added but its use in the final paste or composition is not desirable. Any pigments or mixture of pigments may be utilized, carbon black, milori blue, nigrosine, zinc white, chrome green, chrome yellow, ultra-marine blue, vermillion, sienna, umber, Turkey red lake, etc. and the like being examples of suitable pigments. Soluble dyestuffs or lakes prepared from same may be used but the inorganic pigments are preferred. Dimethyl phthalate, triacetin, dibutyl tartrate, triphenyl phosphate, the alkyl derivatives of toluene sulfonamid are illustrative of the type of plastifiers which may be used in preparing the printing ink. The plastifier selected should be such that it will have some solvent action on the cellulose derivative base to be printed. Mixtures of these various plastifiers may also be used. Where considered advantageous small amounts of linseed oil, castor oil or resins may be added to attenuate the composition.

The use of the so called "half second" or lacquer viscosity pyroxylin gives excellent results when employed in making up an ink in accordance with our invention. Excellent results were also obtained when cellulose acetate of similar low viscosity characteristics was used. Other cellulose esters or cellulose ethers of low viscosity also give very good results.

The printing compositions made up in accordance with our invention, utilizing a low viscosity cellulose derivative have the desired body without being too thick or viscous. The various ingredients of the printing compositions may be mixed in any suitable manner. Good results are obtained by using a kneader or by employing warm malaxating rolls. Small quantities of volatile solvents such as alcohol, acetone, ethyl acetate and the like may be added to assist the dissolving of the cellulose derivative in the solvent plastifier. Where such volatile solvents are employed, it is advisable to remove the same by evaporation before utilizing the printing compositions. Where thinners are required for the composition the plastifier used in making the composition can be used in the regular way. Suitable pigments are ground into the paste as desired. Soluble dyestuffs, such as rhodamine, chrysoidine, etc. or lakes prepared from the same, may be added to the printing paste, supplementing or replacing the pigment.

The following are a few examples of compositions which are suitable for use in accordance with our invention. These examples are merely illustrative and our invention is not to be considered as limited to these specific compositions. Variation in the proportions of the ingredients and the manner of compounding the same will suggest themselves to those skilled in the art and such variations are to be considered within the scope of the invention.

Example I

| | Parts |
|---|---|
| Low viscosity nitrocellulose | 100 |
| Dimethyl phthalate | 200 |

These ingredients are mixed in a kneader or on malaxating rolls until a homogeneous mass or paste results. Into the paste thus obtained is then ground pigments sufficient to give the desired color, for example, 25 to 75 parts of the pigment to 100 parts of the paste. For black ink a suitable mixture of carbon black, milori blue and spirit soluble nigrosine give good results.

Example II

| | Parts |
|---|---|
| Low viscosity cellulose acetate | 100 |
| Dimethyl phthalate | 200 |

These ingredients are mixed as in Example I and the desired amount of pigment added.

Example III

| | Parts |
|---|---|
| Low viscosity cellulose butyrate | 100 |
| Dimethyl phthalate | 200 |
| Triacetin | 100 |

These ingredients are mixed in the manner set out in Example I and the desired amount of pigment added to the resultant paste.

Example IV

| | Parts |
|---|---|
| Low viscosity cellulose acetate | 100 |
| Triacetin | 250 |
| Triphenyl phosphate | 25 |
| Mixture of para and ortho ethyl toluene sulfonamid | 125 |

These ingredients are mixed as set out in Example I and a suitable amount of pigment added.

Example V

| | Parts |
|---|---|
| Low viscosity ethyl cellulose | 100 |
| Dimethyl phthalate | 250 |

These ingredients are mixed as set out in Example I and suitable pigment added.

Printing compositions prepared according to the above formulas were used with good results for decorating or printing on all types of cellulose derivative materials. Preferably the surface being printed should be a matt surface. Although they were devised for application to cellulose acetate plastics, they were found to be equally applicable to cellulose nitrate and cellulose ether pastics. This is an important advantage in that the printer does not have to maintain a large number of different printing compositions for use upon different cellulose plastics.

Another important advantage arising from the use of our improved inks is the fact that they are very quick setting. In fact the printed sheets may be polished almost immediately after printing without any danger of ink transference. This is in marked contrast to the practice with the types of ink now used for celluloid printing which inks contain oxidizable oils which depend upon oxidization for setting. Such inks must be allowed to stand for 24 to 48 hours for the ink to become sufficiently set to permit polishing or further handling.

The inks prepared according to our invention penetrate into the nitrocellulose or cellulose acetate or similar stock being printed and the subsequent application of heat and pressure in the polishing step effects an amalgamation or anchoring of the ink in the stock. Our improved printing compositions do not become gummy on standing and are odorless and harmless to the skin. Moreover the pigments may be more uniformly and homogeneously dispersed in the colloidal composition forming the ink than is possible in the inks as heretofore prepared. It will thus be seen that our improved inks possess marked advantages. Due to their rapid setting qualities they result in a great saving of time in the printing of celluloid like sheets and the finishing of such printed sheets; they are odorless and free from tackiness; they permit a more uniform distribution of the pigment.

Our printing composition may be applied to the celluloid-like sheets or plastics in any way, for example, by means of engraved rolls, by spraying, stencilling and the like. They may also be applied by brushing or spreading and then subsequently polished.

The term "low viscosity" as used in the specification and claims is to be construed as including cellulose derivatives having a viscosity of 20 seconds or less or about $\frac{1}{16}$ to $\frac{3}{4}$ the viscosity of cellulose acetate used for making artificial silk. The method used in measuring the viscosity of the nitrocellulose used in Example I is as follows: A solution is prepared by adding 12.2 parts by weight of the nitrocellulose, 22 parts of 95% denatured alcohol, 48.3 parts 90° benzol and after shaking adding 17.5 parts of 99% ethyl acetate and again shaking until solution is completed. This corresponds to a 16 ounce per gallon solution.

A glass tube 14 inches long and 1 inch in diameter is used. A rubber stopper is inserted in the lower end, and two filemarks made 2 inches from each end. The solution is brought to 25° C. and poured into the tube. A steel ball-bearing $\frac{5}{16}$ inch in diameter and weighing 2.043 grams is dropped into the liquid after being previously moistened with the solvent used above, and the time required for it to traverse the 10-inch column of liquid noted on a stop-watch. The foregoing method for determining the viscosity is well-known and extensively used in the art.

The compositions prepared in accordance with our invention may be employed as vehicles for carrying colors. The color is ground in the cellulose ester-plasticizer vehicle, resulting in a very fine dispersion of the color. No volatile solvents are present in the final composition although they may be employed in its preparation. The pastes thus obtained may be used for making lacquers, color dopes, being thinned to the desired degree.

Having described our invention what we claim and desire to secure by Letters Patent is:

1. A fluid printing ink suitable for printing cellulosic plastics containing 100 parts low viscosity cellulose nitrate, 200 parts dimethyl phthalate and 75 to 200 parts pigment.

2. A fluid printing ink suitable for printing cellulosic plastics containing 100 parts low viscosity cellulose acetate, 200 parts dimethyl phthalate and 75 to 200 parts pigment.

3. A fluid printing ink suitable for printing cellulosic plastics containing 100 parts low viscosity cellulose acetate, 200 parts dimethyl phthalate, 100 parts triacetin and 75 to 200 parts pigment.

4. A fluid printing ink suitable for printing cellulosic plastics containing 100 parts half second cellulose nitrate, 200 parts dimethyl phthalate and 75 to 200 parts pigment.

5. A fluid printing ink suitable for printing cellulose acetate plastics containing 100 parts half second cellulose acetate, 200 parts dimethyl phthalate and 75 to 200 parts finely ground pigment.

6. A fluid printing ink suitable for printing cellulose acetate plastics containing 100 parts low viscosity cellulose nitrate, 200 parts dimethyl phthalate and 75 to 200 parts finely ground pigment.

7. A fluid printing ink suitable for printing cellulose acetate plastics containing 100 parts low viscosity cellulose acetate, 200 parts dimethyl phthalate and 75 to 200 parts finely ground pigment.

8. A fluid printing ink free from volatile solvents and suitable for printing cellulosic plastics containing 100 parts of a low viscosity cellulose derivative, 200 to 400 parts of solvent plastifier, and coloring matter, said plastifier being a solvent for the cellulosic plastic.

9. A fluid printing ink suitable for printing cellulosic plastics containing 100 parts of a low viscosity cellulose derivative, 200 to 400 parts of solvent plastifier and 25 to 200 parts of pigment the said plastifier being a solvent for the cellulosic plastic.

AMERIGO F. CAPRIO.
WILLIAM BOWKER.